March 2, 1965  E. J. JOHNSTON  3,171,243
RAKE TOOTH MOUNTING BAR AND RAKE TOOTH MOUNTING
Filed March 20, 1963
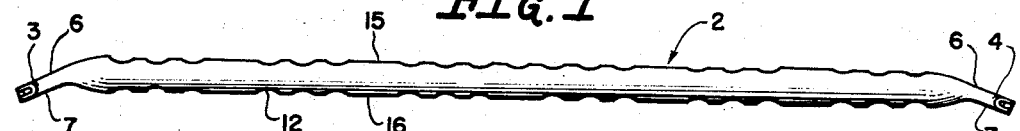
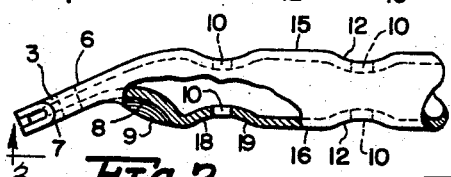
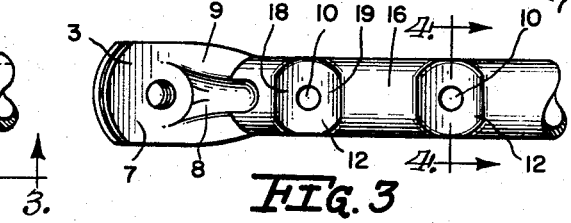
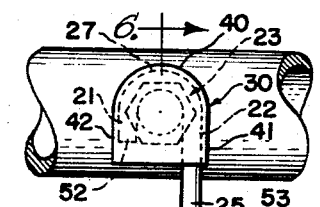
INVENTOR.
Edward J. Johnston
John J. Kowalik
Atty.

United States Patent Office 3,171,243
Patented Mar. 2, 1965

3,171,243
RAKE TOOTH MOUNTING BAR AND RAKE TOOTH MOUNTING
Edward J. Johnston, La Grange Park, Ill., assignor to International Harvester Company, Chicago, Ill., a corporation of New Jersey
Filed Mar. 20, 1963, Ser. No. 266,660
6 Claims. (Cl. 56—400)

This invention relates to rakes and more specifically to a novel construction of the tine bars and to the mounting of the rake teeth thereto.

It is a customary practice to drill holes through the tine bar pipe to support the bolts which secure the tines to the bar. This practice is universal and necessitates the provision of a spring clip which is sleeved over a carriage bolt, the clip being disposed between the head of the bolt and the anchor portion of the tine bar, said anchor portion being buttressed against the side of the bar against which the same is drawn up by the nut threaded on the opposite end of the bolt.

The drilling of the tine bar is expensive and time-consuming and was heretofore considered absolutely necessary in order to prevent deformation of the bar. I have discovered a novel method of forming the pipe tine bar with a cold punching operation such as to obtain a novel configuration in the pipe section which rigidifies the bar in a vertical plane such that in comparative tests of the drilled tine bar as against the cold punched tine bar the latter has survived the tests whereas the drilled bar broke.

A general object of the invention is to provide a novel tine bar which is formed from a pipe section of cylindrical shape, said pipe section having indentations formed therein at diametrically opposite sides thereof and the indentations being oriented on the vertical sides of the pipe (as distinguished from the top and bottom portions of the pipe) when it is in place in the machine so that vertical strengthening gussets are provided, of arcuate shape, which materially increase the vertical strength of the pipe to resist the vertical forces imposed by the teeth in a raking operation.

A further object of the invention is to provide a novel cold punched rake tooth bar which, due to the punching operation, provides depressions along the length of the bar, the said depressions forming confronting wedge faces converging transaxially of the bar and providing seats for the legs of a U-shaped anchor portion of the tooth, the legs being adapted to be urged by the head of the novel bolt associated therewith into wedging engagement with the bar to improve the securement of the tooth to the bar and to prevent its displacement through rotation or otherwise with respect to its position on the bar.

The invention contemplates a novel interlocking arrangement for a spring tooth to the support bar, the bar being provided with wedge faces converging transaxially of the bar and the spring tooth being provided with a U-shaped anchor portion having laterally spaced legs which respectively engage the wedge faces, said U-shaped portion being nested within a complementary slot in the head of a novel bolt which has a shank portion extending through openings in the bar which are located at the focus or apex of the convergence of the wedge faces, said bolt being provided with a nut on the side of the bar remote from the area of engagement of the tooth anchor portion whereby the anchor portion is adapted to be drawn up against the tooth bar as the nut is threaded on the shank portion of the bar and abuts against the remote side of the bar.

A general object of the invention is to provide a novel and improved securement for a rake tooth to a tine bar which greatly reduces the cost and which improves the connection between the respective parts.

A still further object of the invention is to provide a novel tine bar wherein the operation of the punching of the bar to admit the securing bolt also deforms the bar to form the seating or wedge faces for the associated tooth and at the same time displaces the material to provide a novel gusset structure which improves the fatigue life and the resistance of the bar to breaking.

Although various theories may be advanced to this unexpected improvement in the life of the bar, the construction heretofore disclosed in face has been found to provide these beneficial and unexpected properties.

These and other objects and advantages inherent in and encompassed by the invention will become more apparent from the specification and the drawings wherein:
FIG. 1 is a plan view of the novel tine bar;
FIG. 2 is a cross-section taken substantially on the line 2—2 of FIG. 1;
FIG. 3 is a side elevational view of an end portion of the tine bar on an enlarged scale;
FIG. 4 is an enlarged fragmentary plan view of an end portion of the tine bar;
FIG. 5 is a fragmentary side elevational view of the novel tine bar and tine and mounting assembly therefor;
FIG. 6 is a cross-sectional view taken substantially on the line 6—6 of FIG. 5;
FIG. 7 is an inner end view of the novel securing element;
FIG. 8 is a side elevational view;
FIG. 9 is a cross-sectional view taken substantially on the line 9—9 of FIG. 8;
FIG. 10 is a side elevational view of the novel securing element fragmentarily shown; and
FIG. 11 is a view comparable to FIG. 10 showing a further modification of the structure.

Describing the invention in detail and having particular reference to the drawings there is shown a tine bar generally designated 2 which is of the type adapted to be utilized between the end members of a parallel bar rake as is well known to those skilled in the art. The tine bar is of stock pipe construction and is a tubular or cylindrical member and at each end is flattened to provide end connecting portions 3, 4. Each end portion is flattened in such manner as to provide opposing substantially vertical flat sides 6 and 7, the side 7 merging into the peripheral contour of the pipe and the side 6 being more abruptly indented as at 8, 8 and then merging in a sweeping curve into the periphery. The indentations at 8 are disposed at opposite sides of a substantially horizontal rib formation 9 which tends to form a gusset structure between the surfaces 8 and 6 on the inside angle thereof to provide a reinforcement and thus prevent early fatiguing or a weak area in this area of connection.

Along the length of the bar there are punched in a cold punching operation, as well known to those skilled in the art, a plurality of aligned front and rear substantially horizontal apertures 10, 10. The punch, in perforating the openings 10, indents the surrounding metal and since it is unsupported this area forms into an arcuate shape to provide a substantially vertical gusset structure 12 which is concaved inwardly toward the axis of the support bar. These gussets 12 are formed along the back and front sides 15 and 16 of the bar in transverse alignment along the entire length thereof and serve as rigid columns to improve the vertical strength of the bar. The punching operation in forming the gussets 12 deforms the surrounding area of the bar and forms opposing wedge faces 18, 19 at opposite sides of the opening 10 and these wedge faces form seats for the generally parallel legs 21 and 22 of the U-shaped anchor portion 23 formed at the upper end of the extension 25 of the tooth or tine generally designated 26. The leg portions 21 and 22 are interconnected by a bight portion 27. The end portion or anchor portion 23 is admitted within the respective cavity or depression 28 defined by the concaved side of the webs or ribs 12 and are held in position by the novel securing member generally designated 30 which comprises a bolt having a shank portion 31 which passes through the aligned openings 10, 10 in the opposing webs 12, 12, said shank portion extending beyond the back side 16 of the tine bar and thereat being provided with threads as at 36 on which is threaded a nut 37 which has a conical end 38 which is admitted complementally into the cavity 28 and engages the surfaces 18 and 19 to tightly secure the nut in place. The forward end of the shank 31 is provided with a head 39 of novel configuration, said head having an arcuate upper edge 40 merging into upright lateral edges 41 and 42 which terminate at a substantially flat bottom edge 43. The interior side of the head is provided with a U-shaped cavity 45 which admits the anchor portion of the tine, said cavity 45 being in fact a U-shaped channel which has a slightly greater width than the diameter of the cylindrical shaped wire from which is formed the end portion of the tine as well as the remainder of the tine. It will be noted that the recess or channel 45 is of greatest depth along its lateral edges as at 47 and 48 and shallows out along the lower portions thereof as at 49 and 50 to provide a firm engagement with the lower portions 52 and 53 of the legs 21 and 22 against the opposing portion of the tine bar. It will be realized that as the bolt is drawn up the legs 21 and 22 will wedge against the wedge surfaces 18 and 19 and thus be drawn inwardly and in view of the resilient nature of the material, which is of spring steel, a firm wedging action will be obtained and in view of the confinement by the head of the bolt the tine bar will be prevented from moving out of position. It will be noted that the shank portion 25 is at one end of the coil spring convolution 55 of the tine bar and that the opposite end convolution of the coil 55 is projected downwardly into a tine member 56. The coil is located partly under the tine bar and functions to relieve excessive loading on the anchor portion.

The embodiment of FIG. 11 is substantially identical to that of FIG. 10 except for the fact that the outer face of the bolt head is indented as to 60 to provide the center block 61 whereas the block 61 in the previous design is obtained by displacement of the material from the forming or forging of the cavity 45.

Having described a preferred form of the invention it will be appreciated that various other variations are encompassed in the instant invention as set forth in the appended claims.

What is claimed is:

1. In a device of the class described, a horizontally mountable hollow tubular elongated tine bar, said bar having a plurality of indentations along the length thereof forming pockets concaved toward the axis of the bar for receiving an associated tine bar mounting portion, and said bar having openings disposed centrally of said pockets for reception of tine securing means.

2. The invention according to claim 1 and surfaces on the bar which define said pockets constituting providing wedge faces within said pocket converging toward said bar axis.

3. The invention according to claim 2 and a tine finger having a securing end portion with surfaces complementary to said wedge faces and in engagement therewith and securing means extending through said openings in the and drawing said tine finger securing end portion into said pocket against said wedge faces.

4. The invention according to claim 3 and a tine finger having a U-shaped securing end portion comprising a pair of laterally spaced resilient legs engaging respective wedge faces in the pocket, and securing means comprising a bolt having a portion extending between said legs through said openings in the center of the pocket, said bolt having a head drawing said legs against said wedge faces.

5. The invention according to claim 4 and said bolt having a head with a U-shaped cavity complementally receiving said U-shaped tine finger securing end portion.

6. The invention according to claim 5 and said cavity having a bight, and said cavity being of greatest depth at the bight and shallowing out along the legs of said end portion of the tine finger.

References Cited in the file of this patent
UNITED STATES PATENTS

| | | |
|---|---|---|
| 442,794 | Brinkerhoff | Dec. 16, 1890 |
| 2,482,883 | Thomas | Sept. 27, 1949 |
| 2,957,299 | Gustafson et al. | Oct. 25, 1960 |
| 3,065,591 | Gustafson | Nov. 27, 1962 |
| 3,096,609 | Garrett et al. | July 9, 1963 |